Patented July 16, 1935

2,008,447

UNITED STATES PATENT OFFICE 2,008,447

PROCESS OF WELDING CAST IRON AND WELDING ROD FOR SAID PURPOSE

Ture Robert Haglund, Stockholm, and Stig Johan Alvar Ingemar Harlitz, Wargon, Sweden; said Harlitz assignor to said Haglund No Drawing. Application November 15, 1934, Serial No. 753,240. In Sweden September 21, 1933

11 Claims. (Cl. 219—8)

This invention relates to a process for welding of cast iron, particularly by means of electric arc welding, in which the seam during the welding operation is protected by a layer of slag, and which process is characterized by the fact that a titanium or zirconium containing material is added to the weld by means of a welding rod or electrode consisting of a steel alloy containing titanium or zirconium and coated by a slag forming material. It has in this manner been possible to produce a seam which adheres well to the cast iron, and which is mechanically workable with ordinary tools, without first heating the material to be welded. By earlier methods, in such cases where the work piece has not been previously heated, the welding has generally been made by means of a rod of mild steel, which, on the one hand, produces a seam having good adhesion but at the same time renders it very hard and almost impossible to work. It has also been possible to produce mechanically workable welding seams by adding a high percentage of nickel to the same, but the adherency has in such cases been poor and this latter mode of welding may in many cases be characterized as a filling rather than a welding process, since the welding material quite often after only a short time has detached itself from the cast iron.

Titanium or zirconium is, according to the invention, added to the welding seam by means of welding rods of steel alloys of titanium or zirconium, which are coated by a slag forming material, said rods being part of the present invention, since the process of welding herein described is rendered possible and carried out by means of such rods. These rods are suitably made of a malleable ferro-alloy, containing titanium or zirconium. The content of these metals in the ferro-alloy may vary within rather wide limits for different purposes, but should as a rule not exceed 10 per cent. It is advantageous to use alloys containing 1-4 per cent of titanium or zirconium. The carbon content of the alloy is as a rule kept below 0.5 per cent and preferably about 0.1-2 per cent or less. In such cases where the titanium or zirconium content is comparatively high it is, however, possible to employ considerably higher carbon content than above mentioned. It has in many cases also proven of advantage to employ alloys containing both titanium and zirconium. The alloy may also suitably be given a content of silicon e. g. between 0.2-4 per cent. Other alloying components such as manganese, aluminum, etc. may also to a greater or lesser percentage be contained in the titanium or zirconium containing ferro-alloy. Suitable amounts of aluminum may range from about 0.15 to 0.35 per cent, for example. As already mentioned, the welding rod alloy should contain a comparatively low content of carbon. Higher contents of carbon in the alloy have a tendency of rendering the welding seam less coherent, probably due to the fact that a high carbon alloy has a considerably lowered melting point. The molten metal formed during the welding operation will thus not become heated to such a high temperature as is required for producing good adherency. In cases where it is desirable to add carbon material to the welding seam, this may suitably be effected by mixing it with the slag forming coating on the rod, e. g. in the form of graphite. It has been found, however, that only a comparatively small part of this carbon enters the welding seam.

It has previously been suggested to employ pulverized alloys containing titanium or zirconium as deoxidizing agents in slag forming coatings when welding ordinary malleable ferro-alloys. Attempts to employ such welding rods for the welding of cast iron have not resulted in the production of workable seams, which, no doubt, is due to the fact that such additions to the coating, as intended by the inventors, have become completely oxidized during the welding. Only by employing rods of alloys of titanium or zirconium, which at the same time, in order to avoid too much oxidation during the welding operation, are coated by a protective slag forming coating, has it been possible in the welding of cast iron to render the welding seam workable, without previously heating the material to be welded.

As examples of rods, which have produced seams of good adherency and workability, the following may be mentioned:

Example

A welding electrode or rod, coated by a slag forming and carbon containing material, made of a ferro-alloy produced by the aluminothermic process, and containing, in addition to smaller quantities of impurities generally present in steel, 2.1 per cent Ti, 2.9 per cent Si, 0.35 per cent Al, and 0.23 per cent C.

The alloys from which the rods are manufactured may, besides by aluminothermic processes, also be produced by other known metallurgical methods, e. g. by the addition of an alloy high in titanium or zirconium to a steel or ferro-alloy produced in electric furnace, open hearth furnace or crucible.

We claim:

1. Welding rod consisting of an iron alloy containing between 1-4% titanium, 1-4% silicon, with a maximum of about 0.5% carbon, and having a coating which contains slag forming ingredients.

2. Welding rod consisting of an iron alloy containing between 1-4% zirconium, 1-4% silicon, with a maximum of about 0.5% carbon, and having a coating which contains slag forming ingredients.

3. Welding rod consisting of an iron alloy containing between 1-4% of at least one of the elements titanium and zirconium, 1-4% silicon, with a maximum of about 0.5% carbon, and having a coating which contains carbon material and slag forming ingredients.

4. A welding rod consisting of an iron alloy containing from about 1 to 10 per cent of at least one metal selected from the group consisting of titanium and zirconium and a small amount, not substantially exceeding about 0.5 per cent of carbon, and having a coating containing slag-forming ingredients.

5. The welding rod of claim 4 which contains from about 1 to 10 per cent of titanium.

6. The welding rod of claim 4 which contains from about 1 to 10 per cent of zirconium.

7. The welding rod of claim 4 in which the coating contains graphite.

8. The welding rod of claim 4 which also contains from about 0.15 to 0.35 per cent of aluminum.

9. The welding rod of claim 4 which also contains from about 1 to 4 per cent of silicon.

10. The welding rod of claim 4 which also contains from about 1 to 4 per cent of silicon and about 0.15 to 0.35 per cent of aluminum.

11. A process of welding cast iron which comprises melting down a welding rod at a place to be welded without preliminary heating of the cast iron parts and supplying a layer of slag forming material to protect said melt during welding; said welding rod consisting substantially of an iron alloy having a carbon content substantially below that of said cast iron parts, from about 1 to 10 per cent of at least one metal selected from a group consisting of titanium and zirconium and which may also contain from about 1 to 4 per cent of silicon and from about 0.15 to 0.35 per cent of aluminum.

TURE ROBERT HAGLUND.
STIG JOHAN ALVAR INGEMAR HARLITZ.